Oct. 20, 1970  A. W. BYRD  3,535,562
POWER SYSTEM WITH HEAT PIPE LIQUID COOLANT LINES
Filed Feb. 16, 1968  3 Sheets-Sheet 1

INVENTOR(S)
AMBROSE W. BYRD
BY
ATTORNEY(S)

Oct. 20, 1970  A. W. BYRD  3,535,562
POWER SYSTEM WITH HEAT PIPE LIQUID COOLANT LINES
Filed Feb. 16, 1968  3 Sheets-Sheet 3
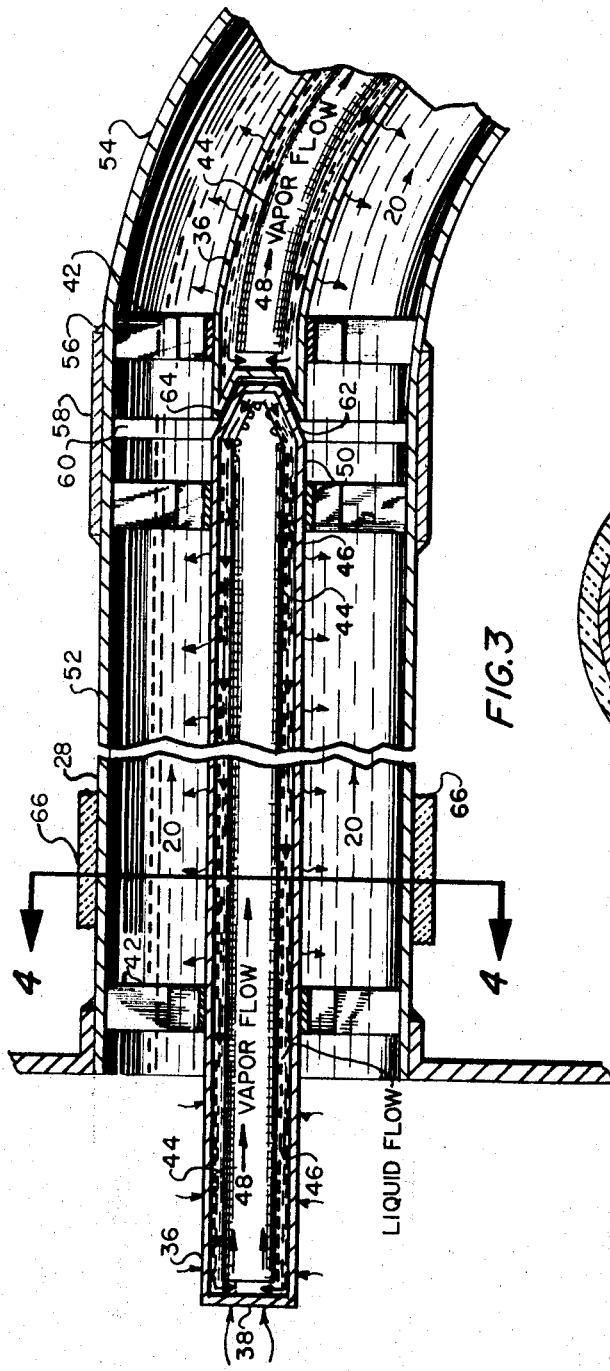
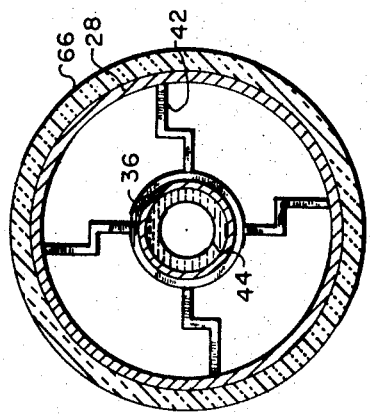
INVENTOR(S)
AMBROSE W. BYRD
BY

United States Patent Office 3,535,562
Patented Oct. 20, 1970

3,535,562
POWER SYSTEM WITH HEAT PIPE LIQUID COOLANT LINES
Ambrose W. Byrd, Huntsville, Ala., assignor to the United States of America as represented by the Administrator of the National Aeronautics and Space Administration
Filed Feb. 16, 1968, Ser. No. 706,013
Int. Cl. H01j 45/00
U.S. Cl. 310—4      7 Claims

ABSTRACT OF THE DISCLOSURE

A power system having a number of thermionic diodes connected in parallel. The diodes use heat pipes as cathodes. The system employs a circulatory cooling system utilizing liquid metal coolant lines which are heated by a series of heat pipes butted end-to-end and extending through the center of the lines.

The invention described herein was made by an employee of the United States Government and may be manufactured and used by or for the Government for governmental purposes without the payment of any royalties thereon or therefor.

BACKGROUND OF THE INVENTION

Field of the invention

The invention relates to an electric power system and more particularly to an electric power system utilizing a circulatory liquid-coolant cooling system.

Description of the prior art

One of the most challenging problems facing scientists and engineers in the design, manufacture and use of alkali metals as coolants in space power systems is how to liquefy the coolant in the circulating lines on original start up or restart after a coast period or a shutdown for maintenance. Normal terrestrial design would include heavy thermal insulating blankets combined with electrical heaters embedded in the thermal insulating blankets wrapped around the circulating lines. However, space power systems cannot afford the luxury of electrical heaters because of weight limitations as well as on-board power limitations. For instance, one known type of space power system using a liquid metal cooled reactor with Rankine conversion produces 3 to 4 megawatts electrical for onboard use. If the reactor had to be shut-down for maintenance and could not be made ready for use in a few hours the liquid metal would freeze in the reactor, coolant lines, and radiator, thus rendering the power plant useless unless some method could be devised to economically remelt the coolant. However, the space power system mentioned above requires approximately 5 megawatts electrical to unfreeze the coolant. Therefore, the system could not produce enough power to get itself going, even assuming that it could produce power at all without the coolant.

SUMMARY OF THE INVENTION

Accordingly, it is an object of this invention to develop an electric power generator with an improved liquid coolant system.

A further object of the invention is to construct an electric power system with an improved circulatory liquid coolant system having the capability of heating frozen coolant in the coolant lines.

Yet another object of the invention is to construct an electric power system with an improved circulatory cooling system having the capability of heating frozen coolant in its coolant lines without the use of auxiliary heaters.

These and other objects are accomplished in the present invention which provides an electrical power system utilizing a plurality of diodes. The system includes a heat source which is enclosed in a container. The diodes are disposed on the outer surface of the heat source container. Both the heat source container and the diodes are enclosed in a pressure vessel which is connected to a cooling system. The cooling system contains a coolant and at least one heat pipe for heating the coolant.

BRIEF DESCRIPTION OF THE DRAWINGS

The invention will be more fully understood by the following detailed description when taken together with the accompanying drawings in which:

FIG. 3 is a sectional view of the coolant lines;

FIG. 4 is a sectional view, taken along line 4—4 of FIG. 3.

DESCRIPTION OF THE PREFERRED EMBODIMENT

Figure 1:
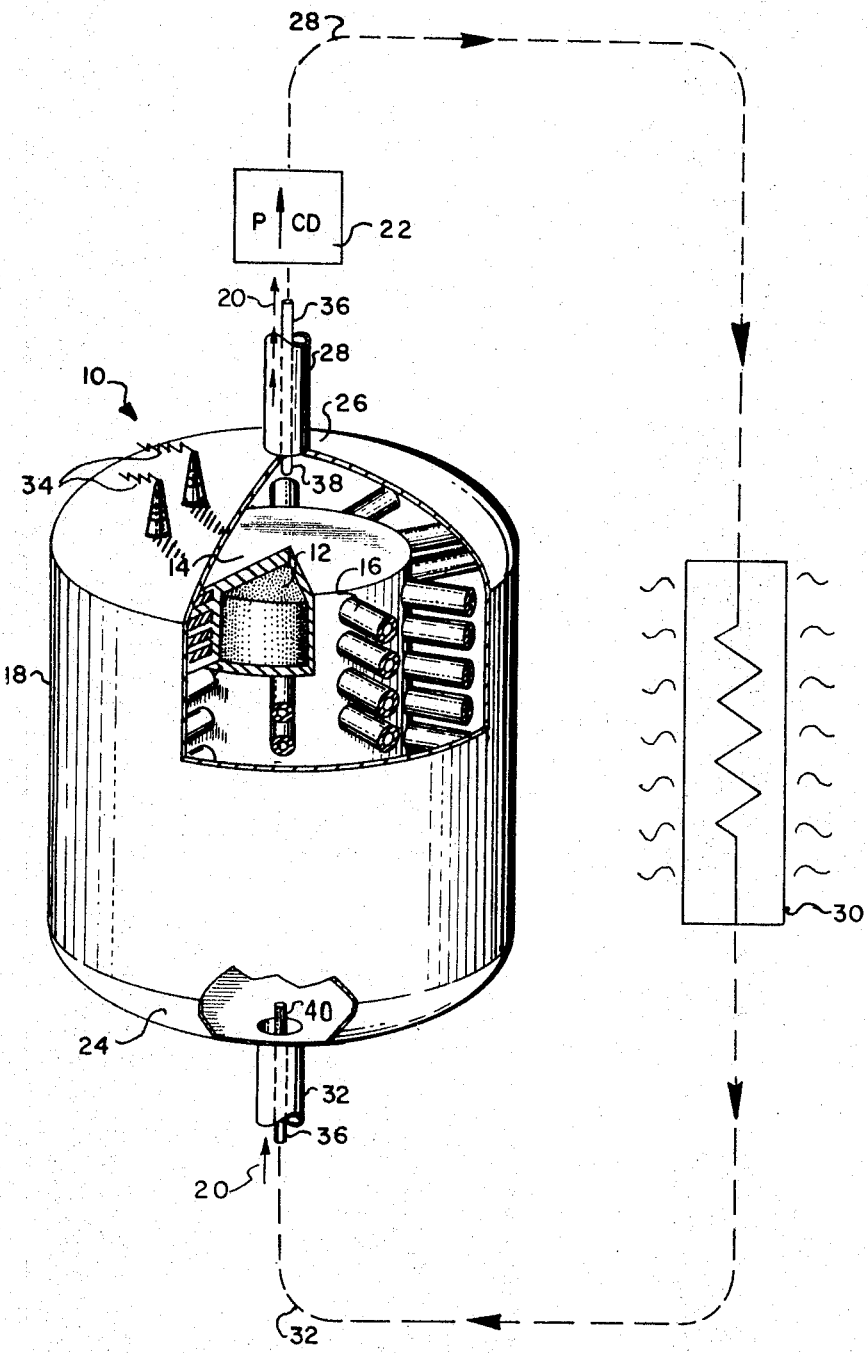
FIG. 1 is a perspective view of the power system with portions of the pressure vessel and the heat source container cut away.

With continued reference to the accompanying figures wherein like numerals designate similar parts throughout the various views and with initial attention directed to FIG. 1, there is illustrated a typical embodiment of the power system designated by the numeral 10. A heat source 12, which may be a radio-isotope heater, a reactor, or a combustion chamber, is enclosed in a container 14. The heated ends of the heat pipe thermionic diodes 16 are embedded in the heat source container 14. The heat source 12, container 14, and diodes 16 are contained in a pressure vessel 18. The diodes 16 are connected in parallel so that the total power output of the power system 10 may be connected through output terminals 34 to an external load (not shown).

The details of the construction of the heat pipe diodes 16 are disclosed in my copending application, Ser. No. 666,553, filed Sept. 6, 1967, but are not considered, per se, to be a part of the present invention.

A circulatory cooling system is used to cool the heat source 12 via the diodes 16. Liquid metal coolant 20 is circulated by electro-magnetic pump 22 through the pressure vessel 18, out of the top 26 of the pressure vessel 18, through output coolant line 28, through heat exchanger (radiator) 30, through input coolant line 32, and back into the bottom 24 of the pressure vessel 18. As will be shown in more detail hereinafter, a plurality of heat pipes 36 are butted together end-to-end and are suspended in the center of the coolant lines 28 and 32. It should be noted that the end 38 of the heat pipe 36 in the output coolant line 28 and the end 40 of the heat pipe 36 in input coolant line 32 both extend into the pressure vessel 18 a substantial distance, for reasons which will be explained later.

Referring again to FIG. 1, one cycle of operation of the power system 10 is as follows: heat flows from radioactive heat source 12 to cause current to flow in diodes 16 which are embedded in the heat container 14. Output current flows to output terminals 34 for connection to an external load (not shown). Electro-magnetic pump 22 cools the heat source 12 and diodes 16 by pumping liquid metal coolant 20 through pressure vessel 18 and in sequence through output cooling line 28, radiator 30, input cooling line 32 and back to pressure vessel 18.

Looking now to FIG. 2 of the drawings, the structural details of the output coolant line 28 will be described. Heat pipes 36 are butted together end-to-end and suspended by struts 42 in the center of the coolant line 28. As may be seen best in FIG. 1, end 38 protrudes out of coolant line 28 so that it may extend into the pressure vessel 18 and thereby absorbs heat from the heat source 12. Input coolant line 32 is similar in construction to output coolant line 28 and therefore will not be described separately in detail.

Figure 2:
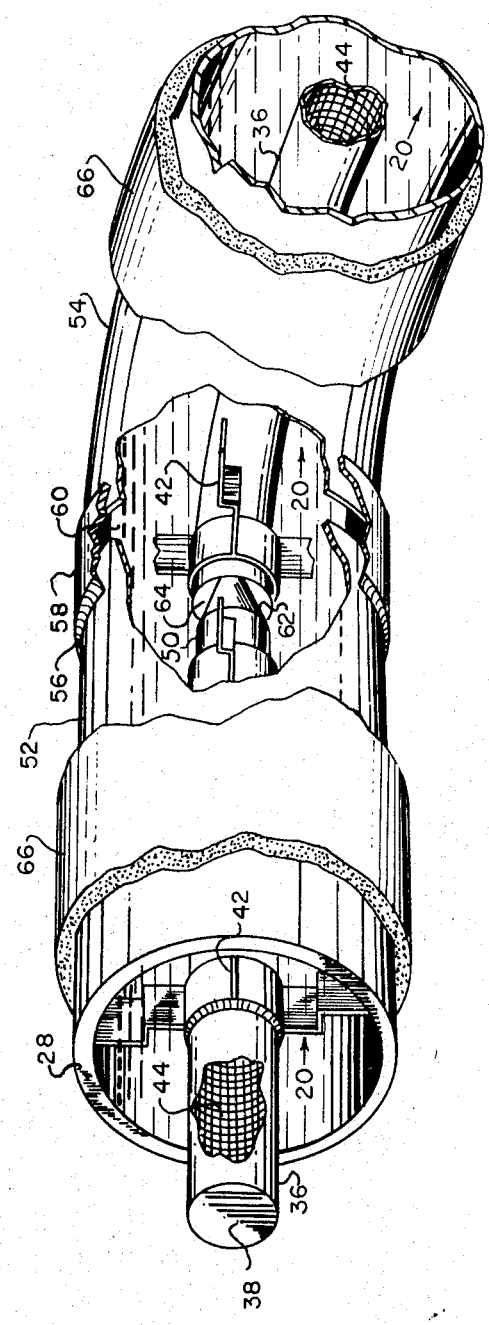
FIG. 2 is a perspective view of the coolant lines partially cut away to show heat pipes mounted inside the lines.

Looking now at FIGS. 2 and 3, the structural details of heat pipes 36 may be seen. Each heat pipe 36 is a pipe which is sealed at each end and encloses a wick 44 and heat transfer fluid 46. At the heated end 38 of the device, heat is absorbed by vaporization of the heat transfer fluid 46. The vapor 48 forms from fluid 46, then expands, and permeates the heat pipe 36. The vapor 48 moves under vapor pressure along the length of the heat pipe 36, giving up its latent heat of vaporization and condensing to fluid 46 in the heat removing end (condenser section) 50 of the heat pipe 36. The condensed fluid 46 is returned to the vaporizer (heated end) 38 of the heat pipe 36 by means of capillary flow through the annular wick 44.

Looking now at FIG. 3, it may be seen that coolant line straight section 52 and elbow 54 are welded together at 56 through the use of a sleeve 58 overlapping the butt joint 60. Male tapered end 62 of one heat pipe 36 mates with the female tapered end 64 of the next heat pipe, thereby cascading the heat pipes' thermal gradient from each end of the assembly toward the radiator 30. A $\Delta T$ exists across each cascaded joint but it is small and therefore does not materially affect the efficiency of the system.

As may be seen best in FIG. 4, the heat pipes 36 are supported in the coolant lines by offset struts 42 welded to the heat pipe 36 but free to move within the coolant line for expansion, displacement, and misalignment. Thermal insulation 66, which is shown in FIGS. 2, 3, and 4, increases the thermal efficiency of the system.

The operation of the heat pipes in the cooling system is as follows: assuming the heat source 12, the pressure vessel 18 and the coolant lines 28 and 32 are charged with coolant 20 and the coolant 20 has solidified, the heat source 12 is started up with a slow increase in power. This melts the coolant 20 within the pressure vessel 18. Heat is then transferred from the melted coolant 20 via the heat pipes 36 to the frozen coolant 20 in coolant lines 28 and 32, thereby melting the remainder of the coolant 20. During the melting process, the small amount of coolant 20 which is melted near the heat pipes 36 allows circulation by the pump 22. Thus, heat is transferred by forced convection and the system 10 is brought to full operation quickly and efficiently.

The heat transfer fluid 46 within the heat pipe should be the same substance as the coolant working fluid 20 on the outside of the heat pipes. This minimizes materials compatibility problems, high $\Delta P$ across the heat pipe walls, and coefficients of expansion problems. Although several of the lighter metals are suitable for use as a coolant, Lithium appears to be the preferred coolant for a space power system because of its low density, high thermal conductivity, high surface tension, high specific heat, and low vapor pressure.

From the foregoing, it may be seen that applicant has invented a novel electric power system with an improved circulatory cooling system which can heat its own coolant when it is frozen without the use of auxiliary heaters. This is done quickly and efficiently through the use of the extremely high heat transfer capability of the heat pipes. An important collateral effect of the invention is that during steady state operation, continuous heat transfer down the heat pipes will reduce the overall $\Delta T$ of the coolant. Since all "heat dump" in space is by radiant heat transfer, which increases as $T^4$, maintenance of the coolant temperature at a high level until it reaches the radiator, also improves system efficiency. Moreover, since this is an incompressible flow system, heat transfer down the heat pipes will also have the effect of maintaining viscosity at a lower level, thus reducing pressure drop along the coolant lines with attendant reduction in required pumping power.

Obviously, numerous modifications and variations of the present invention are possible in the light of the above teachings. It is therefore to be understood that, within the scope of the attendant claims, the invention may be practiced otherwise than is specifically described.

I claim:

1. A device for generating electric energy comprising:
   (a) a pressure vessel;
   (b) a heat source;
   (c) a container for said heat source, said container being positioned within said pressure vessel;
   (d) a plurality of diodes disposed on the outer surface of said heat source container;
   (e) a cooling system connected to said pressure vessel for cooling said diodes, said cooling system containing a coolant and comprising means for heating said coolant to than said coolant when it is frozen.

2. The device for generating electrical energy of claim 1 wherein said cooling system is a circulatory system comprising:
   (a) an input coolant line connected to one side of said pressure vessel;
   (b) an output coolant line connected to said pressure vessel;
   (c) a pump connected in series in said system;
   (d) a heat exchanger connected ot said input and output lines;
   (e) a liquid coolant flowing through all said other elements of said cooling system and also flowing through said pressure vessel to complete its cycle and cool the said diodes;
   (f) means for heating said coolant to thaw said coolant when it is frozen, said means comprising
      (1) a first plurality of heat pipes positioned inside said input coolant line and
      (2) a second plurality of heat pipes positioned inside said output coolant line.

3. A device for generating electric energy comprising:
   (a) a pressure vessel;
   (b) a heat source;
   (c) a container for said heat source, said container being positioned within said pressure vessel;
   (d) a plurality of diodes disposed on the outer surface of said heat source container;
   (e) a cooling system connected to said pressure vessel for cooling said diodes, said cooling system being a circulatory system comprising:
      (1) an input coolant line connected to one side of said pressure vessel;
      (2) an output coolant line connected to said pressure vessel;
      (3) a pump connected in series in said system;
      (4) a heat exchanger connected to said input and output lines;
      (5) a liquid coolant flowing through all said other elements of said cooling system and also flowing through said pressure vessel to complete its cycle and cool the said diodes;
      (6) a first plurality of heat pipes positioned inside said input coolant line and supported inside said input coolant line by struts;
      (7) a second plurality of heat pipes positioned inside said output coolant line and supported inside said output coolant line by struts.

4. The device for generating electric power of claim 3 wherein each said heat pipe comprises:
   (a) a cylindrical section of pipe having two closed ends;
   (b) a fluid contained inside said pipe, for removing heat from the first end of the pipe, through vaporization of said fluid, and discharging heat to the pipe at its opposite end, through condensation of said fluid; and (c) a wick positioned along the inner surface of said pipe for returning said fluid from said opposite end to said first end.

5. The device for generating electric power of claim 4 wherein said heat pipes are butted together end-to-end.

6. The device for generating electric power of claim 5 wherein said heat pipes are mated through tapered fittings at their ends.

7. The device for generating electric power of claim 6 wherein the first said heat pipe in said input line and the first said heat pipe in said output line each protrudes into said pressure container.

References Cited

UNITED STATES PATENTS

| | | | |
|---|---|---|---|
| 837,499 | 12/1906 | Perkins et al. | 165—105 |
| 1,750,750 | 3/1930 | Gay | 165—105 |
| 1,754,314 | 4/1930 | Gay | 174—15 |
| 2,529,915 | 11/1950 | Chausson | 165—105 X |
| 3,054,914 | 9/1962 | Hatsopoulos et al. | 310—4 |
| 3,252,015 | 5/1966 | Johnson | 310—4 |
| 3,378,449 | 4/1968 | Roberts et al. | 176—33 |

DONOVAN F. DUGGAN, Primary Examiner

U.S. Cl. X.R.

165—105